United States Patent [19]

Kim

[11] 4,307,956

[45] Dec. 29, 1981

[54] GRAPHIC ART CORRECTION STYLUS

[76] Inventor: Tom Kim, 5635 Tyron, Van Nuys, Calif. 91401

[21] Appl. No.: 41,744

[22] Filed: May 24, 1979

[51] Int. Cl.[3] .......................... G03D 15/00; H02K 7/14

[52] U.S. Cl. .................................... 354/348; 51/170 T

[58] Field of Search ................................ 354/348-350, 354/352; 81/9.2; 51/170 T, 262.1, 170 R; 408/95

[56] References Cited

U.S. PATENT DOCUMENTS

| | | | |
|---|---|---|---|
| 463,619 | 11/1891 | Burdick | 51/170 T UX |
| 571,642 | 11/1896 | Bradford | 354/348 |
| 695,009 | 3/1902 | Swan | 354/348 X |
| 1,077,146 | 10/1913 | Lemon | 51/170 R UX |
| 1,296,432 | 3/1919 | Russell | 354/349 |
| 1,391,763 | 9/1921 | Dickinson | 51/170 T |
| 1,500,426 | 7/1924 | Townsend | 81/9.2 |
| 2,495,146 | 1/1950 | Straughn | 354/348 |
| 2,553,688 | 5/1951 | Thompson | 51/170 T |
| 2,625,063 | 1/1953 | Hanson | 408/95 |
| 3,550,481 | 12/1970 | Jensen | 408/115 UX |
| 3,688,450 | 9/1972 | Brockman | 51/181 |
| 3,935,909 | 2/1976 | Mabuchi et al. | 51/170 T X |

OTHER PUBLICATIONS

Dremel Moto-Tool Publication, pp. 1-15.

*Primary Examiner*—Donald A. Griffin

*Attorney, Agent, or Firm*—H. Gordon Shields

[57] ABSTRACT

A graphic art correction stylus includes a cylindrical body which houses a motor and a battery for rotating a fluted stylus secured to one end of the cylindrical body, and at the opposite end of the cylinder is a fixed stylus.

6 Claims, 7 Drawing Figures

GRAPHIC ART CORRECTION STYLUS

BACKGROUND OF THE INVENTION

1. Field of the Invention

This invention relates to a stylus, and, more particularly, to a stylus usable in graphic arts for correcting imperfections in emulsion on a film by removing a portion of the emulsion.

2. Description of the Prior Art

For retouching photographic negatives and positives, in which an imperfection is found on the emulsion layer, a needle is generally used to remove the imperfection. The needle is used as a digging instrument to remove the unwanted emulsion from the film. After removing the blemished emulsion there may be a gap in the emulsion which must be smoothed over or filled in in order to prevent an imperfection from resulting in the finished picture. The needle is again used to smooth over or fill in the gap. Such needles are typically rather pointed, since the size of the imperfections may be rather small.

In some cases, as when an imperfection is relatively large, a sharp knife blade may be used to remove the imperfection in the emulsion. The use of the knife blade obviously has its limitations, particularly with respect to the dexterity of the user and the size of the imperfection. It is understood that the emulsion adjacent the imperfection is preferably not disturbed in any way, or, if it is disturbed, only by a minimal amount which may be smoothed over or filled in.

In removing the imperfections, it will be noted that only the emulsion layer should be removed, and not the film layer which comprises the substrate for the emulsion. The size of the imperfection may vary from very, very small to rather large. Under most circumstances, it is necessary to use a magnifying glass to observe the imperfections and to remove the imperfections. Obviously, for small imperfections, a very fine point or sharp pointed needle may be used, while a larger instrument may be used for the larger imperfection.

For printing purposes, a picture is composed of a series of dots, ranging from very small dots which are difficult to see individually with only the naked eye, up to relatively large dots which may be easily seen with the naked eye. The smallest or finest dot is produced by a three hundred line screen, and accordingly a relatively sharp pointed needle is necessary to use on a single dot made by such a three hundred line screen. For larger dots, a relatively larger instrument may be used. However, the size of the instrument used to remove the imperfections or dots should still be small enough to avoid disturbing the emulsion adjacent the imperfections. And, as stated above, only the emulsion should be removed and not the film substrate.

With the use of a needle or pin, an imperfection is eliminated by removing the emulsion which contains the imperfection. The hole in the emulsion which remains on the film substrate after the removal of the imperfection is then filled and smoother in place to remove all trace of the imperfection.

The implements or tools described above, which are in contemporary usage, are strictly manually operated tools which depend on the dexterity of the fingers of the user for control in both the removal of the undesired emulsion and the smoothing of the hole or void after the removal. The removal of the emulsion accordingly may be a relatively tedious task, and a lack of care or attention at all times on the part of the operator or individual using the implement may result in substantial damage to both the emulsion and the film substrate.

The apparatus of the present invention overcomes the deficiencies of the prior art by providing a dual instrument, one end of which includes a powered, rotating stylus for removing the blemished emulsion and the other end of which includes a pointed needle or stylus, fixed in place but removable.

SUMMARY OF THE INVENTION

The invention described and claimed herein comprises a battery operated, motor driven stylus which is fluted for the removal of emulsion from a film substrate, and a fixed needle or stylus is secured to the opposite end of the apparatus from the rotating stylus. The rotating stylus includes an adjustable shield which is disposed on the emulsion layer to protect the emulsion layer from inadvertent damage by the operator or user of the apparatus.

Among the objects of the present invention are the following:

To provide new and useful stylus apparatus;

To provide new and useful graphic art correction stylus for removing emulsion from a film substrate;

To provide new and useful rotating stylus for removing emulsion;

To provide new and useful battery operated stylus apparatus;

To provide new and useful fluted stylus apparatus;

To provide new and useful stylus having a shield to protect the surface on which the stylus is disposed;

To provide new and useful apparatus having interchangeable stylus heads; and

To provide new and useful stylus apparatus having a fixed needle or stylus at one end and a rotating stylus at the opposite end.

DESCRIPTION OF THE PREFERRED EMBODIMENT

Figure 1:
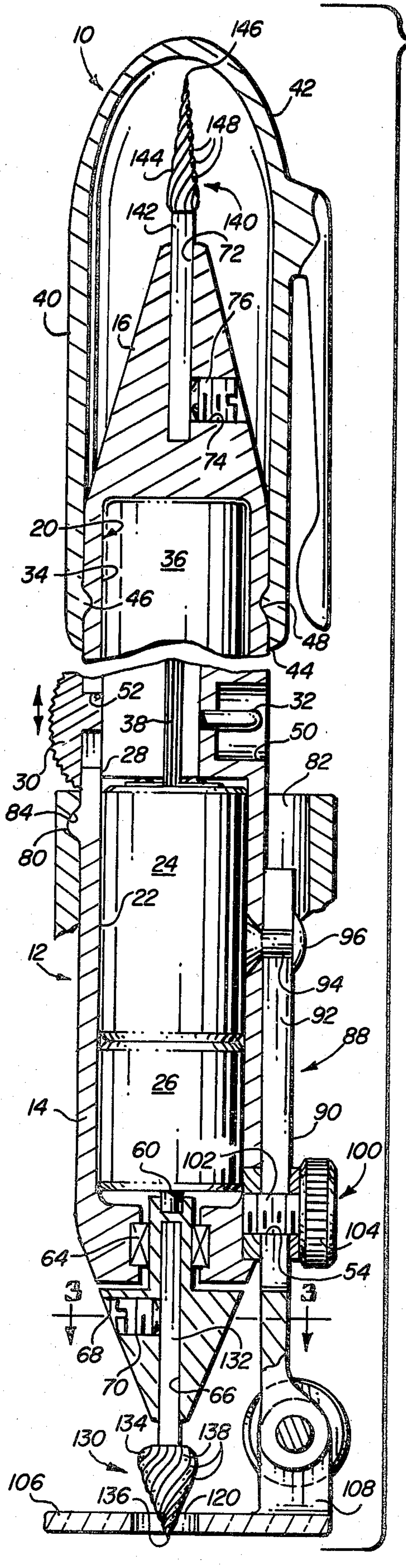
FIG. 1 is a view in partial section of the apparatus of the present invention.
Figure 2:
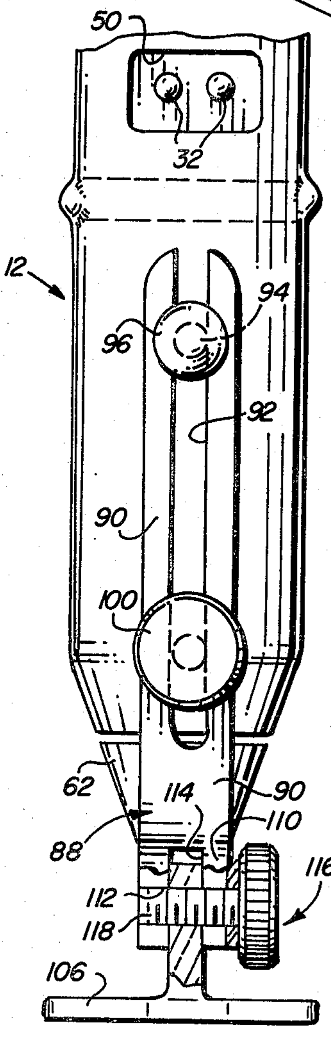
FIG. 2 is a side view of a portion of the apparatus of FIG. 1.

FIG. 1 comprises a view in partial section of stylus apparatus 10 of the present invention, illustrating the major components of the present invention. FIG. 2 is a side view of the lower portion of the stylus apparatus 10 of FIG. 1. Reference will be made primarily to FIGS. 1 and 2 for the following general description of the stylus apparatus 10.

Stylus apparatus 10 includes a cylindrical body 12 which includes a forward or rotating stylus portion 14, and a fixed, rear portion 16. Within the cylindrical body 14 is an interior chamber 20, which may be divided into three primary portions, including a forward portion 22 which houses a motor 24, a gear box 26, and the bearings and chuck associated therewith, as discussed below. Rearwardly of the forward portion 22 is a middle or central portion 28, which includes a switch 30 and a recharger plug 32. Rearwardly of the central portion 28 of the interior chamber 20 is a battery portion 34. A rechargeable battery 36 is disposed within the chamber portion 34. The body 12, with its interior chamber 20, defines a housing for the motor 24, the battery 36, and the related elements.

A cap 40 is shown disposed over the fixed rear portion 16 of the cylindrical body 12. The cap 40 is a generally cylindrical cap which is closed at one end by a rounded dome 42. Opposite the dome 42 is an open end 44. Within the cap 40, spaced apart slightly, axially, from the open end 44, is an inwardly extending circumferential ridge 46. The ridge 46 mates with a groove 48 which extends inwardly into the cylindrical body 12. The ridge and groove cooperate to retain the dome 42 in place over the rear portion 16 of the cylindrical body 12. The cap includes a clip for securing the apparatus to a user's pocket, in a well known manner.

Extending between the electric motor 24 and the battery 36, disposed in the battery portion 34, are appropriate conductors 38, some of which are connected to the slide switch 30, the motor 24, and the battery 36. Two of the conductors extend from the recharge plug 32 to the battery 36.

The recharger plug 32 is disposed in a recess 50 which extends inwardly with respect to the cylindrical body 12. As is well known in the art, a recharger cord may be secured to the recharge plug 32 for recharging the battery 36.

Opposite the recess 50, diametrically speaking, is an aperture 52 which extends through the wall of the cylinder body 12 to provide communication between the exterior of the apparatus and the central portion 28 of the interior chamber 20. The slide portion of the switch 30 extends through the aperture 52 to allow a user of the apparatus 10 to actuate the switch 30, as desired.

The motor 24 is preferably a relatively slowly rotating electric motor, driven by the battery 36. The output shaft (not shown) of the motor 24 extends into the gear box 26 which reduces the speed of the motor 24 to a relatively low number of revolutions per minute. The gear box 26 includes an output shaft 60 which is secured to a chuck 62. The chuck 62 is journaled for rotation in an appropriate bearing 64, which may be a sleeve bearing, or a thrust bearing, as desired. The axial thrust or force encountered with the use of the stylus apparatus 10 is minimal because of the potential danger of breaking through the emulsion layer and into the film substrate layer.

Since a film layer is typically about 0.007 inches in thickness, and the emulsion layer is only about 0.001 inches in thickness, the user must be careful in using the apparatus of the present invention, as with the apparatus of the prior art, with respect to removing only the imperfections found in the emulsion layer, and leaving the film substrate intact. The axial force transmitted through the stylus tips to the gearing within the gear box 26 and ultimately to the motor 24 is extremely minimal.

From the motor 24 through the gear box 26, and to chuck 62, the apparatus has a minimum of vibration. Obviously, if the motor and its train provide substantial vibration problems, the use of the apparatus as a practical tool will be minimized. Accordingly, appropriate care must be taken with respect to the motor, the gear box, and the chuck.

It will be noted that the forward portion 14 of the cylindrical body 12 tapers inwardly, as in a conical configuration, where the chuck 62 joins or connects to the cylinder 12. The chuck 62 includes a bore 66 which has a square cross section. The bore 66 extends axially through the chuck to receive the shank of the various stylus tips, as discussed below. A radially extending bore 68, which is internally threaded, intersects and thus communicates with the bore 66, and receives a set screw 70 which is used to secure a shank 132 of a stylus 130 in the bore 68.

Figure 3:
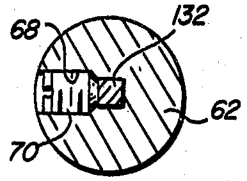
FIG. 3 is a view in partial section of a portion of the apparatus of FIG. 1, taken generally along line 3—3 of FIG. 1.

FIG. 3 comprises a view in partial section of the chuck 62, taken generally along line 3—3 of FIG. 1. It shows the set screw 70 extending into the bore 68. The set screw bears against the shank 132 of the stylus 130.

At the opposite end of the cylindrical body 12 from the forward portion 14, and extending axially inwardly in the rear portion 16, is another squarely configured bore 72. The bore 72 is substantially the same configuration as the bore 66. However, the bore 72 is fixed in the rear portion 16 of the cylindrical body 12, while the bore 66 rotates with the chuck 62.

It will be noted that the rear portion 16 of the cylindrical body 12 tapers inwardly, away from the center or middle portion 78, to define a generally conically configured point. The square bore 72 extends axially inwardly, or longitudinally substantially coaxially with respect to the bore 66 at the opposite end of the cylinder 12.

A radially extending bore 74, which is internally threaded, extends through the rear portion 16 and communicates with the bore 72. A set screw 76, which is externally threaded, is exposed in the bore 74 to hold the shank of a stylus tip securely within the bore.

Circumferentially extending about the cylinder 12, at about the central portion 28, is a pair of outwardly extending ridges 80, which extend outwardly a distance slightly greater than the external diameter of the cylinder 12, but their arcuate length is relatively short. The ridges are designed to mate with an internal grooved portion of a cap 82, only a portion of which is illustrated in FIG. 1. The cap 82 is substantially the same, generally speaking, as the cap 42, except that the cap 82 includes an internally extending groove 84 which matingly engages the external ridges 80 of the cylinder 12, while the cap 42 includes the ridge 46 which frictionally engages the groove 48 in the cap 42 to secure the cap and the cylinder together. It will also be noted that the cap 82 is of an elongated configuration, instead of cylindrical, to accommodate shield apparatus 88 secured to the cylinder 12.

Extending axially with respect to the cylinder 12, is a bifurcated tongue or arm 90. The tongue or arm 90 includes a central slot 92 which receives a pin 94 which is secured to the cylinder 12. The pin 94 includes a head 96, the diameter of which is greater than the width of the slot 92. The diameter of the pin 94 is about the same as the width of the slot 92. The pin moves freely in the slot to allow the shield 88 to be adjusted or moved axially with respect to the cylinder 12.

The pin 94 is disposed on the cylinder spaced apart from the chuck 62, which is located on the front or forward portion of the cylinder 12. Between the chuck 62 and the pin 94 is a screw 100, which includes a threaded shank 102 and a knurled head 104. The threaded shank 102 extends into an internally threaded, and radially extending, bore 54. The bore 54 extends radially inwardly into the lower portion 14 of the cylinder 12, above the chuck 62. The bore 54 is internally threaded to engage the external threads of the shank 102 of the screw 100. The shank 102 of the screw 100 extends through a lower portion of the slot 92 of the tongue 90 to secure the shield in place on the cylinder 12. Accordingly, the bottom or lower surface of the head 104 is preferably smooth, and may include a cushioning gasket as desired.

At such time as the shield is in a proper position, the screw 100 is secured against the tongue or arm 90 to hold the shield in place.

As best shown in FIG. 2, the slot 92 is open at its upper end, adjacent the pin 94. The open slot divides the tongue 90 axially into a bifurcated arm. The open slot also allows the shield 88 to be removed from the cylinder 12 by withdrawing the tongue or arm 60 axially with respect to the cylinder 12, and away from the pin 94 and the screw 100.

Figure 4:
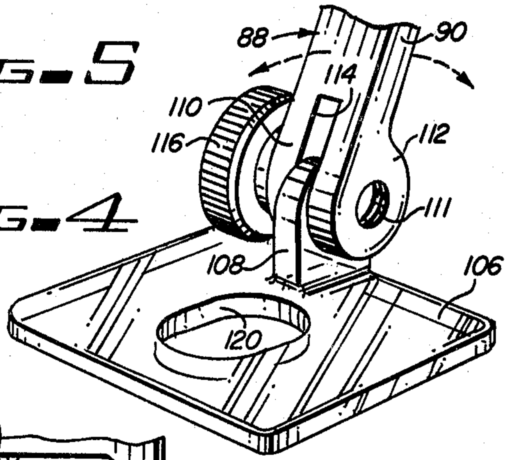
FIG. 4 is an enlarged perspective view of a portion of the apparatus of FIG. 1.

At the lower portion of the tongue or arm 90 there is a foot 106 secured to the tongue or arm 90. The foot 106 is shown in perspective in FIG. 4, and it is also shown in FIGS. 1 and 2. FIG. 4 comprises a perspective view of the lower portion of the shield 88, including the lower portion of the tongue or arm 90 and the foot 106.

The foot 106 is of a generally square configuration, and is preferably made of clear material, such as plastic, to enable the user of the stylus apparatus 10 to view a negative or positive through the foot 106. Centrally disposed along one edge of the foot 106 is an upwardly extending primary arm 108. The arm 108 cooperates with a pair of secondary arms 110 and 112 on the lower part of the primary arm 90 to secure the foot 106 to the tongue or arm 90. Between the lower secondary arms 110 and 112 is a slot 114 which receives the upwardly extending arm 108 of the foot 106. The arms 110 and 112 of the tongue or arm 90 comprise a bifurcated portion which defines the slot 114. The slot 114 receives the arm 108. The three elements 108, 110, and 112 include apertures which are aligned with each other and through which a screw 116 extends. The screw 116 is used to secure the foot 106 in place with the arm 90.

It will be noted that the width of the slot 114 is substantially the same as the width of the upwardly extending arm 108 of the base 106. Accordingly, the arm fits snugly between the spaced apart arms 110 and 112. The shank of the screw 116 comprises a pivot point about which the foot 106 pivots on the arm 90 to allow a user to hold the stylus 10 in his normal, accustomed manner as he works. The shank of the screw 116 is, of course, threaded, and an aperture 111 in the arm 110 in which the shank 118 of the screw 116 extends is also threaded so as to secure the foot 106 to the arm 90.

As best shown in FIG. 4, but as also shown in FIG. 1, the foot 106 includes an aperture 120 extending therethrough. The purpose of the aperture 120 is best shown in FIG. 1, in which a tip 134 of a stylus or bit 130 is shown extending through the aperture 120.

The stylus or bit 130 includes two primary portions, a shank 132 and a tip 134. As discussed above, the shank 134 is preferably square in configuration, and it extends into the chuck 62 and is secured therein by a set screw 70. The securing of the shank 132 in the chuck 62 by the set screw 70 is also shown in FIG. 3, as discussed above.

The tip 134 is of an elongated conical configuration, somewhat rounded, with the widest portion of the tip spaced near the juncture of the tip 34 and the shank 132. The tip then tapers generally inwardly and downwardly to a point 136. The tip includes a plurality of flutes 138, which are relatively small grooves which extend in a helical fashion about the tip 134 from the point 136 upwardly. The flutes perform a cutting operation that slices away the emulsion of a film as the tip rotates when the stylus apparatus 10 is in use.

The foot 106 serves to protect the film as the stylus apparatus 10 is used. The foot is placed on the film and the aperture 120 is placed over the imperfection which is to be corrected. When the switch 30 is actuated, the bit 130 rotates relatively slowly and the tip cuts away the flawed portion of the emulsion.

Three types of bits are illustrated herein, of which the bit 130 is one. A second bit 140 is shown secured at the opposite end of the apparatus 10 from the bit 130. The bit 140 is shown secured to the fixed rear portion of the stylus apparatus 10 and secured in the square bore 72 by a set screw 76. The bit 140 includes a square shank 142 secured to a tip 144 is also of a generally conical configuration, similar to the tip 134 of the bit 130. However, the tip 144 is less rounded than the tip 134, and is of a more elongated or pointed conical configuration, extending from the shank 142 and terminating in a relatively sharp point 146. A plurality of flutes 148 extends from the tip 146 in a helical fashion throughout or along the length of the tip 144.

Figure 5:
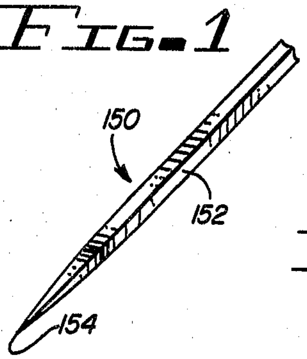
FIG. 5 is a perspective view of a needle usable with the apparatus of the present invention.

FIG. 5 comprises a perspective view of a portion of a needle 150 that normally may be used in the fixed rear portion 16, as opposed to a fluted bit, such as the bit 140. The needle 150 includes a square shank 152 which tapers to a point 154. The point 154 is relatively sharp and elongated. The needle 150 does not include flutes, as do the bits. The needle 152 is not designed for rotation or for cutting, and accordingly does not rotate normally. Thus, it is typically used in the fixed rear portion 16 of the cylinder 12, and secured in the square bore 72 by the set screw 76.

Figure 6:
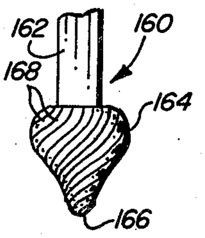
FIG. 6 is a side view of a stylus point usable with the apparatus of the present invention.

FIG. 6 comprises a side view of a third type of bit 160. The bit 160 also includes a square shank 162, substantially identical to the shanks 132 and 142 of the bits 30 and 40, and also like the shank 152 of the needle 150. A tip 164 is secured to the shank 162. The tip 164 is more rounded than either the tip 134 or 144, and accordingly it tapers to less of a point 166 than is found on either the points 136 or 146 of the bits 130 and 140, respectively. A plurality of flutes 168 also extend helically about the tip 164 from the point 166 to the shank 162. Obviously, the tip 164 is designed to remove fairly large amounts of emulsion from a film and is accordingly preferably used when the imperfections to be removed are relatively large. The tips 134 and 144 are respectively used with decreasingly smaller sized imperfections. The preference of the individual user will, of course, be paramount in selecting a specific bit for use.

Figure 7:
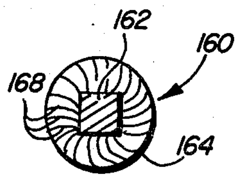
FIG. 7 is an end view of the stylus of FIG. 6.

FIG. 7 comprises a top view of the bit 160, showing the square configuration of the shank 162 and the generally rounded configuration of the tip 164. The top of the flutes 168, which extend from the shank 162 to the relatively blunt point 166 (see FIG. 6), are also shown in FIG. 7.

The stylus apparatus 10 comprises a housing 12 having a rotating stylus at one end and a fixed stylus at the opposite end. A simple inversion of the housing or body 12 allows the use to switch from one to the other. Protective caps are provided for covering each stylus. The rotating stylus comprises a bit having helical cutting grooves for cutting away the emulsion. Three types of bits are disclosed. One bit is a generally slim, cone shaped bit, the second is somewhat broader, and the third is somewhat oval, but all three maintain the general conical configuration. The fixed stylus may comprise a slender needle.

With the shield 88 disposed in the film, protecting the emulsion layer of the film, the rotating stylus or bit is used to cut away the imperfection in the emulsion. It will be noted that the flutes on the various bits provide a cutting action rather than a tearing action. The result of such cutting action is a more controlled removal of the imperfection.

It will be noted that the apparatus shown in the Figures of the drawing are enlarged substantially and are not drawn to any scale.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Graphic art correction stylus apparatus, comprising, in combination:

housing means;

first stylus means, including bit means rotatably secured to the housing means at one end thereof;

means disposed in the housing means and connected to the bit means for rotating the bit means;

switch means for controlling the rotation of the bit means;

second stylus means fixedly secured to the housing means at the other end thereof;

a removable cap secured to the housing means for covering the second stylus means;

shield means adjustably secured to the housing means for pivoting movement and for axial movement and disposed adjacent to the first stylus means through which the first stylus means extends for protecting the graphic art being corrected.

2. The apparatus of claim 1 in which the shield means includes an arm secured to the housing means;

a foot pivotally secured to the arm; and aperture means in the foot through which the tip of the first stylus means extends.

3. The apparatus of claim 2 in which the foot of the shield means is transparent for viewing through the foot.

4. The apparatus of claim 1 in which the bit means of the first stylus means includes a shank portion for securing the bit to the housing means;

a tip portion secured to the shank portion;

a point on the tip portion remote from the shank portion; and a plurality of flutes extending helically on the tip.

5. The apparatus of claim 1 in which the housing means includes a bore remote from the first stylus means.

6. The apparatus of claim 5 in which the second stylus means comprises a needle disposed in the bore.

* * * * *